United States Patent [19]

Smith

[11] 3,929,549
[45] Dec. 30, 1975

[54] SURFBOARD CONSTRUCTION
[76] Inventor: Robert L. Smith, 435 Fair Drive, Apt. No. 103, Costa Mesa, Calif. 92626
[22] Filed: Dec. 14, 1973
[21] Appl. No.: 424,727

Related U.S. Application Data
[62] Division of Ser. No. 316,058, Dec. 18, 1972, Pat. No. 3,802,010.

[52] U.S. Cl. ............... 156/245; 9/310 E; 156/304; 156/330
[51] Int. Cl.² ..................... A63C 15/02; B29C 5/02
[58] Field of Search ........... 156/242, 245, 304, 330, 156/182, 77, 78; 9/310 R, 310 E; 249/95, 96, 98, 99, 154, 160, 173; 264/45, 249, 250, 251, 261

[56] References Cited
UNITED STATES PATENTS
3,514,798   6/1970   Ellis ................................. 9/310 E
3,543,315   12/1970  Hoffman ........................... 9/310 E
3,580,799   5/1971   Velzmann et al. ................ 156/330
3,615,969   10/1971  Hegg .................................. 156/78

Primary Examiner—Caleb Weston
Attorney, Agent, or Firm—Lindenberg, Freilich, Wasserman, Rosen & Fernandez

[57] ABSTRACT

A surfboard which is constructed by molding two halves that each extend across the entire length of the board but across only half of the width, and joining the halves together with a thick layer of epoxy resin which also serves as a beam that strengthens the board against bending. Each half of the board has a fiberglass skin and a body of foam within the fiberglass skin, but the foam is cut away at the top and bottom of the inner surface so that the epoxy resin adheres to a large area of the fiberglass skin. The epoxy resin in the cut-away areas forms top and bottom flanges for the structural beam of epoxy resin.

3 Claims, 10 Drawing Figures

U.S. Patent  Dec. 30, 1975  3,929,549
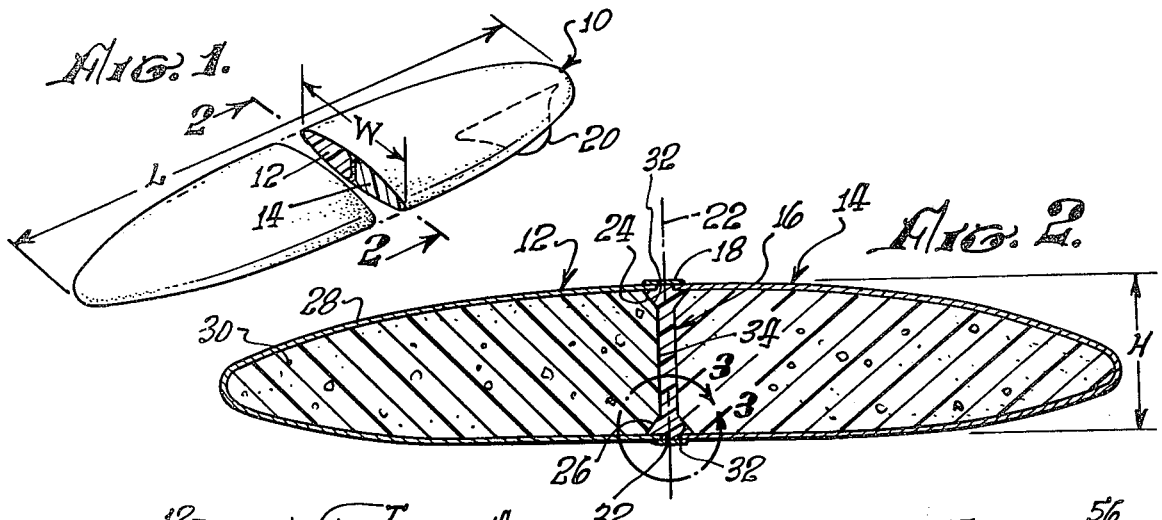
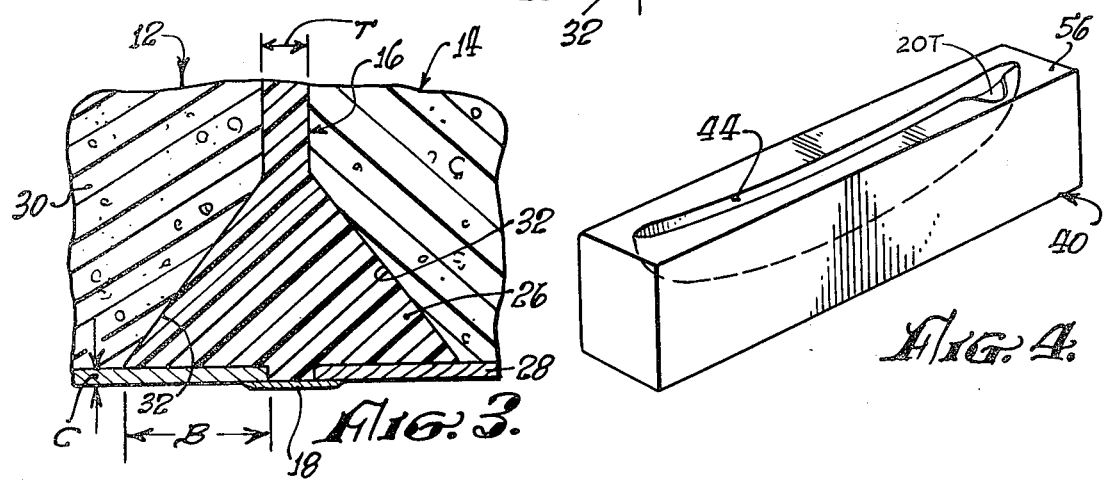
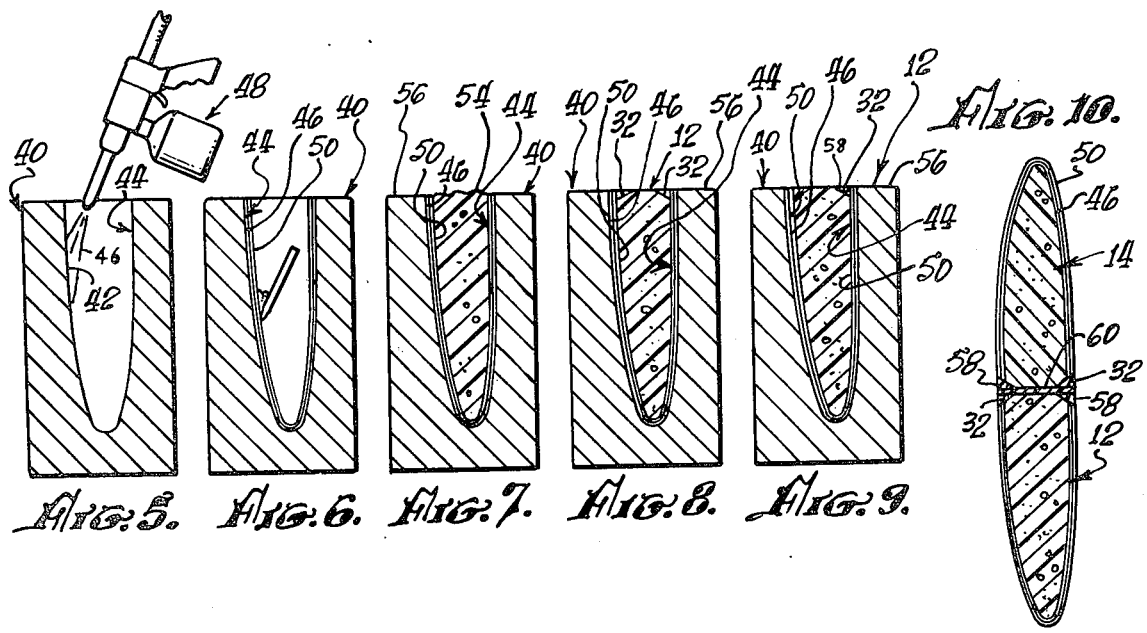

SURFBOARD CONSTRUCTION

CROSS-REFERENCES TO RELATED APPLICATIONS

This application is a divisional of U.S. Pat. Application Ser. No. 316,058 filed Dec. 18, 1972, now U.S. Pat. No. 3,802,010, entitled SURFBOARD CONSTRUCTION, by Robert L. Smith.

BACKGROUND OF THE INVENTION

This invention relates to surfboards.

Surfboards are generally constructed by shaping a light material such as a plastic form or balsa wood to the desired shape, applying resin-impregnated fiberglass over the board to form a tough skin, and sanding the skin to smooth it. In many cases, the board is strengthened by the use of a strip of redwood or spruce which extends down the middle of the board along its length. While these methods of construction can produce surfboards of high quality and durability, the considerable hand labor results in high cost and a nonuniform product.

SUMMARY OF THE INVENTION

In accordance with one embodiment of the present invention, a surfboard construction method is provided which enables the production of surfboards of a uniform high quality at moderate cost. The method includes forming two board halves by laying a fiberglass layer in each of two molds and then filling the molds with a form material. A wedge-shaped section of foam material is cut away along the entire perimeter of the mold so that a region of the inner surface of the fiberglass skin is exposed. The two board halves are joined by a thick layer of epoxy resin that also fills the cutaway regions of the foam. The completed surfboard therefore includes two molded halves that are joined by a thick layer of epoxy which is enlarged near the top and bottom of the board.

The layer of epoxy serves not only to join the two surfboard halves together, but also serves as a beam or stringer that strengthens the surfboard against bending. The enlarged top and bottom of the epoxy layer provides a large area of contact with the fiberglass skin on the two board halves, to assure that the skin is held in place. The enlarged top and bottom regions of the epoxy layer also serve as flanges for the epoxy beam to strengthen it. The molding of the surfboard halves assures uniformity and eliminates the need for extensive sanding to produce a smooth finish. The fact that the joint between the board halves extends along the height of the board rather than across its width means that there are no joints along either side or rail of the surfboard where it is subjected to the greatest beating during use.

The novel features of the invention are set forth with particularity in the appended claims. The invention will best be understood from the following description when read in conjunction with the accompanying drawings.

BRIEF DESCRIPTION OF THE DRAWINGS

FIG. 1 is a partially sectional perspective view of a surfboard constructed in accordance with the present invention;

FIG. 2 is a sectional view taken on the line 2—2 of FIG. 1;

FIG. 3 is a view of area 3—3 of FIG. 2;

FIG. 4 is a perspective view of a mold used in the forming of a surfboard in accordance with the invention;

FIGS. 5–9 illustrates various steps in the construction of a surfboard half portion in accordance with the invention; and FIG. 10 illustrates a step in the construction of the surfboard of the invention, wherein the two halves are joined together.

DESCRIPTION OF THE PREFERRED EMBODIMENTS

FIGS. 1 and 2 illustrate a surfboard constructed in accordance with the present invention, which includes two elongated surfboard portions or halves 12, 14 and a thick layer 16 of hardened adhesive joining the two halves together. A decorative stripe 18 extends along the joint, and a rudder or fin 20 is joined to the bottom of the rear end of the board over the joint. Each board half 12, 14 is in the shape of half of a surfboard that is divided by an imaginary vertical plane 22 that passes longitudinally through the middle of a horizontal surfboard, with each board half extending along the length L of the board and across approximately one-half the width W. The adhesive layer 16 extends along the height H of the board and has enlarged flange-like portions 24, 26 at the top and bottom.

Each half board such as the half 12 includes a tough skin or cover layer 28 of a material such as resin-impregnated fiberglass, and a body 30 occupying most of the volume and consisting of a lightweight moldable material such as styrene foam. The adhesive layer 16 is of a high strength adhesive such as an epoxy resin. The adhesive 16 has a large area of contact with the bodies 30 of the two board halves so that it securely holds them together. The enlarged upper and lower adhesive regions 24, 26 serve to provide a large area of contact with the outer skin 28 of the board halves to securely hold them in place.

The skin 28 is thin, so that if it made contact with the adhesive 16 over only its edge, there would be a small area of contact and the skin would not be held securely by the adhesive. The skin 28 is not held down securely to the body 30, so that if the skin were to break away from the adhesive its edge might begin to peel away. To prevent such peeling, the body 30 is provided with cut-away regions 32 at the top and bottom of its inner surface 34, to expose a large area of the inner face of the skin 28, the skin 28 therefore extending beyond the top and bottom of the body at the inner surface 34 thereof. The adhesive 16 fills these cut-away regions 32 of the body and therefore the adhesive has a large area of contact with the skin up to the end of it where peeling might occur, to assure that the skin will be held down. The enlarged top and bottom regions of the adhesive layer also form flanges thereon which strengthen the adhesive beam against twisting. Thus, the adhesive layer 16 serves to securely hold all portions of the board halves together and also serves to strengthen the board against bending.

Each of the board halves 12, 14 is preferably formed by molding, to assure a uniform shape and to provide a desired shape without extensive skilled hand labor. A mold of the type shown at 40 in FIG. 4 can be utilized, employing the construction steps illustrated in FIGS. 5–10. A first step in the forming of a board half such as the half 12 includes applying a wax coating 42 to the walls of the mold cavity 44 as by wiping it on. A layer of coloring material such as a gel coat 46 may be sprayed on with a sprayer 48 as illustrated in FIG. 5. After the gel coat cures, a resin-impregnated fiberglass layer may be applied. A layer of resin-impregnated mat fiberglass may be first laid against the gel coat 46 and then a layer of resin-impregnated fiberglass cloth may be laid on the mat to form a fiberglass covering 50. Excess resin then may be squeegeed off, as with a squeegee 52 as illustrated in FIG. 6. After the resin hardens, a quantity of light weight material 54 may be poured into the mold within the fiberglass shell. A variety of materials can be utilized such as styrene foam. After hardening of the material 54, which will form the body of the board half, the material 54 is trimmed so that it is even with the top surface 56 of the mold and therefore with the fiberglass 50. Then, a wedge-shaped region at 32 (FIG. 8) is cut in the body material along the entire periphery of the upper edge of the fiberglass skin 50. Of course, it is possible to form to cut-away region 32 without actually cutting the material, as by utilizing a contoured cover for the mold 40.

After the board half has been formed, a first quantity of epoxy resin is applied as illustrated in FIG. 9, by filling the cutaway regions 32 in the body 30 with epoxy resin at 58. This epoxy may be allowed to cure while the board half remains in the mold 40. By applying epoxy into the cutout regions prior to removal of the board half from the mold, the danger of bending the overhanging covering layer is reduced. After the epoxy in the cutout regions has hardened partially, the board half with epoxy therein is removed from the mold. A thick layer 60 of epoxy resin in a putty-like consistency is then laid on the board half 12 as illustrated in FIG. 10, over the inner surface 34 of the body and over the wedge-shaped epoxy in the cutout regions thereof. The other board half 14 which has been previously formed in a similar manner is then laid on top of the layer 60. Appropriate holding fixtures are utilized to hold the two mold halves together while the epoxy layer 60 cures. After the epoxy layer 60 partially cures, the excess epoxy is peeled off of the outside of the surfboard. The layer 60 of epoxy adhesive will then be readily noticeable as a joint region that runs along the entire board. The board can be decorated by applying the stripe 18 over the joint, as by laying a length of decorative tape thereon or spraying a strip of gel coat thereon. The tail 20 may be formed integrally by providing a shallow tail mold portion 20T (FIG. 4) which is filled with a gel coat and then with epoxy resin at the same time as the portions at 58. The tail portions of the two molded board halves may be joined, and then sanded to form the required tapers along the edges of the tail.

A typical surfboard has a length L such as six feet, a width W such as twenty-two inches and a height H such as three inches. In such a surfboard which is constructed in accordance with the present invention, the layer 16 of epoxy resin should have a thickness of more than about one-sixteenth inch and preferably about one-eighth inch in order for the layer to greatly strengthen the surfboard against bending. It may be noted that such a thickness is many times greater than a typical thickness of an adhesive layer which would be used to merely join two parts. The covering layer 30 typically has a thickness such as one-sixteenth inch. The adhesive layer 16 preferably extends along the width B of more than twice the thickness C of the covering layer in order to provide a wide area of contact therewith. A width B of approximately three-eighths inch along which the adhesive contacts the inner surface of the covering layer, has been found to securely hold down the covering layer. Of course, the cutout region does not have to be wedge-shaped, but can be of any form that provides a large area of contact with the covering layer and a wide flange for the beam or stringer formed by the adhesive layer 16.

Thus, the invention provides a surf-board of high strength and durability, which can be produced in a uniform shape and with a minimum of hand labor. The board includes a pair of board halves which are joined together by a layer of adhesive. The layer of adhesive can be thick to provide high structural strength against bending of the surfboard. The layer of adhesive also can be provided with enlarged upper and lower portions that adhere to the inner faces of the covering layer of each board half, to assure secure attachment to the covering layer and to also provide flanges on the beam of adhesive. Each board half is constructed in a mold and the two halves are joined by the adhesive, thereby providing a smooth outer surface without the need for hand sanding and assures a predetermined shape for the board.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A method for constructing a surfboard comprising:
   laying cover layers in each of two molds that each have substantially the shape of opposite halves of a surfboard that is divided by an imaginary vertical plane passing longitudinally through the middle of a horizontal surfboard, and that each have a cavity with a depth at least twice as great as the thickness at a middle portion thereof, including applying a thin layer of wax-like material to the mold, spraying a gel coat within the wax-like material, applying flexible fiberglass sheet material saturated with resin within the gel coat, and squeegeeing excess resin from within the fiberglass sheet material;
   filling each mold with a moldable material to form two elongated surfboard portions, each with an inner surface that can lie substantially along said imaginary plane, including pouring foamable material into the shell formed by said cover layer and allowing it to harden;
   forming an elongated cutout region in the molding material along the top and bottom of each elongated surfboard portion at the inner surface thereof to expose an area of the inner face of the cover layer;
   filling the cutout regions with an epoxy resin adhesive and allowing it to harden at least partially; and
   applying a layer of epoxy resin adhesive of a putty-like consistency and of a thickness of more than one-sixteenth inch to the inner surface of the body and to the epoxy adhesive in said cutout regions.

2. A method for constructing a surfboard comprising:
   laying cover layers in each of two molds that each have substantially the shape of opposite halves of a surfboard that is divided by an imaginary vertical plane passing longitudinally through the middle of a horizontal surfboard;

filling each mold with a moldable material to form two elongated surfboard portions, each with an inner surface that can lie substantially along said imaginary plane;

forming an elongated cutout region in the molding material along the top and bottom of each elongated surfboard portion at the inner surface thereof to expose an area of the inner face of the cover layer; and applying a layer of adhesive to the inner surfaces of the two surfboard portions to join them, including filling the cutout regions with adhesive.

3. The method described in claim 2 wherein:

each of said molds has a shallow tail cavity; and including filling each tail cavity with said adhesive to form part of the surfboard tail.

* * * * *